(12) United States Patent
Petito et al.

(10) Patent No.: US 9,811,805 B2
(45) Date of Patent: Nov. 7, 2017

(54) AUTOMATED WORK-FLOW MANAGEMENT SYSTEM WITH DYNAMIC INTERFACE

(75) Inventors: Daniel A. Petito, Rochester, NY (US); Michael P. Petito, Victor, NY (US)

(73) Assignee: eSys Technologies, Inc., East Rochester, NY (US)

( * ) Notice: Subject to any disclaimer, the term of this patent is extended or adjusted under 35 U.S.C. 154(b) by 4171 days.

(21) Appl. No.: 10/664,486

(22) Filed: Sep. 17, 2003

(65) Prior Publication Data
US 2004/0098284 A1 May 20, 2004

Related U.S. Application Data (60) Provisional application No. 60/411,601, filed on Sep. 18, 2002.

(51) Int. Cl.
G06Q 10/10 (2012.01)
G06Q 50/16 (2012.01)

(52) U.S. Cl.
CPC ........... *G06Q 10/10* (2013.01); *G06Q 50/167* (2013.01)

(58) Field of Classification Search
CPC .............................. G06Q 10/00; G06Q 50/00
USPC ..................................... 705/1, 1.1; 713/176
See application file for complete search history.

(56) References Cited

U.S. PATENT DOCUMENTS

| | | | |
|---|---|---|---|
| 5,615,268 A | 3/1997 | Bisbee et al. | |
| 5,631,828 A | 5/1997 | Hagan | |
| 5,664,115 A * | 9/1997 | Fraser | 705/37 |
| 5,748,738 A | 5/1998 | Bisbee et al. | |
| 5,826,250 A | 10/1998 | Trefler | |
| 5,852,811 A | 12/1998 | Atkins | |
| 5,953,012 A | 9/1999 | Veghte et al. | |
| 5,978,804 A | 11/1999 | Dietzman | |
| 5,987,422 A * | 11/1999 | Buzsaki | 705/9 |
| 6,185,576 B1 | 2/2001 | McIntosh | |
| 6,321,202 B1 | 11/2001 | Raveis | |
| 6,654,788 B1 | 11/2003 | Chance | |

(Continued)

FOREIGN PATENT DOCUMENTS

WO    WO 9957847    11/1999

OTHER PUBLICATIONS www.gmd.com, Guardian Mortgage Documents: http://web.archive.org/web/20020602033143/gmd.com/products_services.htm.*

(Continued)

*Primary Examiner* — Lynda Jasmin
*Assistant Examiner* — Kimberly Evans
(74) *Attorney, Agent, or Firm* — Duane C. Basch; Basch & Nickerson LLP (57) ABSTRACT

The present invention is a method and apparatus for the dynamic and customizable display of information pertaining to a work-flow management and document generation system. More particularly the invention utilizes a data driven interface, where at least one table within a database associated with the system is used to generate the customizable interface and dynamic display of information therein. The interface is preferably a browser-based interface where the code for creation of the interface is generated, at least partially, as a function of the information stored within the table. Such a system may be employed, for example, for the display of information relating to the automated processing of a transaction, including a real estate closing process.

18 Claims, 10 Drawing Sheets

(56) References Cited

U.S. PATENT DOCUMENTS

| | | |
|---|---|---|
| 6,684,196 B1* | 1/2004 | Mini et al. .................... 705/26 |
| 6,694,315 B1 | 2/2004 | Grow |
| 6,711,554 B1 | 3/2004 | Salzmann et al. |
| 6,823,319 B1 | 11/2004 | Lynch et al. |
| 7,085,735 B1 | 8/2006 | Hall et al. |
| 7,162,635 B2* | 1/2007 | Bisbee et al. ................ 713/176 |
| 2001/0005829 A1* | 6/2001 | Raveis, Jr. ...................... 705/1 |
| 2002/0156688 A1* | 10/2002 | Horn et al. ..................... 705/27 |
| 2003/0110443 A1* | 6/2003 | Yankovich et al. ....... 715/501.1 |
| 2003/0120560 A1* | 6/2003 | Almeida ........................ 705/27 |
| 2003/0187756 A1* | 10/2003 | Klivington et al. ............ 705/27 |
| 2004/0043758 A1* | 3/2004 | Sorvari et al. ............. 455/414.1 |
| 2004/0093493 A1* | 5/2004 | Bisbee et al. ................ 713/156 |
| 2006/0074793 A1* | 4/2006 | Hibbert et al. ................ 705/38 |

OTHER PUBLICATIONS http://web.archive.org/web/20011211185234/www.gmd.com/products_services.htm; WayBack: gmd.com.*

WayBack: http//web.archive.org/web/20011211185234/www.gmd.com/products_services.htm; Guardian Mortgage Documents Inc., Products & Services, 6 pages.*

* cited by examiner

| CardID | DataSourceTable | DataFieldName | ValueLookupSP |
|---|---|---|---|
| 1036 | Closing3 | LenderBrokerContactName | <NULL> |
| 1036 | Closing3 | LenderBrokerContactFax | <NULL> |
| 1036 | Closing3 | LenderBrokerContactEMail | <NULL> |
| 1036 | PrimaryBuyer | NameLast | <NULL> |
| 1036 | Closing | InvestorID | 'cs_vl_InvestorList '+FileID |
| 1036 | Closing3 | DateReceived | <NULL> |
| 1036 | Closing | ClosingDate | <NULL> |
| 1036 | vwHUD901 | Date1 | <NULL> |
| 1036 | Closing3 | DocPrepFee | <NULL> |
| 1036 | Closing3 | ClosingCoordinationFee | <NULL> |
| 1036 | Closing3 | DocRedrawFee | <NULL> |
| 1036 | Closing3 | DocCourierFee | <NULL> |
| 1036 | Closing3 | GMDFeesTotal | <NULL> |
| 1036 | Closing3 | PreliminaryProcessorID | 'cs_vl_PreliminaryProcessor '+FileID |
| 1036 | Closing | PropertyStateID | 'cs_vl_States '+FileID |
| 1036 | Closing | MortgagePurpose | 'cs_vl_MortgagePurpose '+FileID |
| 1036 | PrimaryBuyer | NameFirst | <NULL> |
| 1036 | Closing3 | DocRushFee | <NULL> |
| 1036 | Closing | InvestorFileNumber | <NULL> |

| HTMLcellDefinition | HTMLLabel | HTMLLabelDefinition | HTMLLabelCellDefinition | HTMLRowDefinition | HTMLFieldOrder | ToolTip | Blocked | Customer | ID |
|---|---|---|---|---|---|---|---|---|---|
| 0 | Lender/Broker Contact Name | 0 | 0 | {height:22', 'class:CardRow'} | 75 | <NULL> | 0 | 0 | 323 |
| 0 | Lender/Broker Contact Fax | 0 | 0 | {height:22', 'class:CardRow'} | 80 | <NULL> | 0 | 0 | 324 |
| 0 | Lender/Broker Contact eMail | 0 | 0 | {height:22', 'class:CardRow'} | 85 | <NULL> | 0 | 0 | 325 |
| 0 | Primary Borrower Last Name | 0 | 0 | {height:22', 'class:CardRow'} | 10 | <NULL> | 0 | 0 | 326 |
| 0 | Investor | 0 | 0 | {height:22', 'class:CardRow'} | 15 | Select Investor fro | 0 | 0 | 327 |
| 0 | Date Received | 0 | 0 | {height:22', 'class:CardRow'} | 20 | <NULL> | 0 | 0 | 328 |
| 0 | Closing Date | 0 | 0 | {height:22', 'class:CardRow'} | 25 | <NULL> | 0 | 0 | 329 |
| 0 | Disbursement Date | 0 | 0 | {height:22', 'class:CardRow'} | 30 | <NULL> | 0 | 0 | 330 |
| 0 | Doc Prep Fee | 0 | 0 | {height:22', 'class:CardRow'} | 35 | <NULL> | 4194304 | 0 | 331 |
| 0 | Closing Coordination Fee | 0 | 0 | {height:22', 'class:CardRow'} | 40 | <NULL> | 4194304 | 0 | 332 |
| 0 | Redraw Fee | 0 | 0 | {height:22', 'class:CardRow'} | 45 | <NULL> | 4194304 | 0 | 333 |
| 0 | Courier Fee | 0 | 0 | {height:22', 'class:CardRow'} | 50 | <NULL> | 4194304 | 0 | 334 |
| 0 | Amount Due | 0 | 0 | {height:22', 'class:CardRow'} | 55 | <NULL> | 4194304 | 0 | 335 |
| 0 | Preliminary Processor | 0 | 0 | {height:22', 'class:CardRow'} | 60 | <NULL> | 0 | 0 | 336 |
| 0 | Property State | 0 | 0 | {height:22', 'class:CardRow'} | 65 | <NULL> | 0 | 0 | 337 |
| 0 | Mortgage Purpose | 0 | 0 | {height:22', 'class:CardRow'} | 70 | Select Purpose of | 0 | 0 | 338 |
| 0 | Primary Borrower First Name | 0 | 0 | {height:22', 'class:CardRow'} | 12 | <NULL> | 0 | 0 | 339 |
| 0 | Rush Fee | 0 | 0 | {height:22', 'class:CardRow'} | 42 | <NULL> | 4194304 | 0 | 340 |
| 0 | Investor Loan Number | 0 | 0 | {height:22', 'class:CardRow'} | 5 | <NULL> | 0 | 0 | 341 |

AUTOMATED WORK-FLOW MANAGEMENT SYSTEM WITH DYNAMIC INTERFACE

The benefit of priority is claimed under 35 U.S.C. 119(e) for U.S. Provisional Application 60/411,601, filed Sep. 18, 2002.

This invention relates generally to the dynamic and customizable display of information on a user interface for a work-flow management system and more particularly to systems and methods, employing computers, for the automated processing of a transaction.

CROSS REFERENCE TO RELATED APPLICATIONS

The following related applications are hereby incorporated by reference for their teachings:

"AUTOMATED WORK-FLOW MANAGEMENT SYSTEM WITH DYNAMIC INTERFACE", D. Petito, U.S. Application No. 60/411,601, filed Sep. 18, 2002; and "AUTOMATED WORK-FLOW MANAGEMENT AND DOCUMENT GENERATION SYSTEM AND METHOD," K. Petito et al., U.S. application Ser. No. 09/971,516, filed Oct. 5, 2001.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The advancement of computer and network systems offer opportunities for automation (e.g., computer driven) of many work processes, including legal tasks such as contract generation and real property closings. However, in many cases, computers and networks have simply expedited the transmission of information without altering the manner in which information depicted or displayed—let alone making the manner of display customizable by a user.

Take for example, the negotiation of a contract. It is currently possible, and in many areas common, for the various parties to the contract, including their legal counsel, to share electronic drafts of the agreement via electronic mail or e-mail. Edits may be made to the electronic document attached to the e-mail and rerouted to the parties for review. Recipients may also print hard copies of such electronic documents for review and editing purposes. While such systems and processes have eliminated the traditional transmission time for contract documents (mailing, faxing, overnight delivery, etc.), the uncontrolled proliferation of electronic documents raises numerous concerns, including: version control, unauthorized disclosure, unauthorized modification, and interruptions in an approval process. What's more, a user is not able to easily review the information pertaining to process (e.g., who has reviewed/approved, what changes were made and when, ancillary documentation, etc.)

Currently, a gap exists in data exchange and party/process interfaces between on-line or paper-based origination and on-line or paper-based transaction, particularly real estate closings. It is such interfaces where closing agent and title agent processing, tasks and communications occur, all or many of which are able to be automated as reflected in the co-pending application for "AUTOMATED WORK-FLOW MANAGEMENT AND DOCUMENT GENERATION SYSTEM AND METHOD," by K. Petito et al., previously incorporated by reference. However, in spite of such advancements, the ability of the information to be displayed dynamically, in a manner that is customizable at an organizational or user level is not believed to be utilized.

The present invention is, accordingly, directed to a system wherein the status and interactive worksheets of a work flow process may be displayed dynamically, and where data, maintained in a database in a manner similar to the work flow data, is used to drive or control the display of such information to a user. In one embodiment described below, the database is maintained on a file server, in a client-server network, which contains archived documents. In one embodiment, the server 30 may actually comprise a plurality of servers, including a web server, database server, and a document archive file server. More specifically, the present invention utilizes database-stored information to control the generation of browser display code, code that in turn is transmitted to a user in a client-server network system, where the user is then able to see and interact through the browser-based user interface. The present invention further contemplates the application of such a system to facilitate a virtual, real property closing or similar legal, financial or accounting services. Although described with respect to a particular embodiment, the present invention is understood to have applications to numerous data-driven work processes and systems intended to provide an interface to such processes.

In accordance with the present invention, there is provided a system for the automated processing of a property transaction, including a real estate closing process and its attendant documentation, including: a network accessible by a plurality of users involved in the property transaction; a database, accessible via said network, said database allowing controlled access by the plurality of users and storing data related to said client, said database further including at least a first table having embedded rules wherein the rules define a work-flow for the property transaction and at least a second table defining the attributes of a display of information associated with said property transaction; and a web-based user interface that provides access to said database, wherein said user interface is dynamically controlled as a function of the second table. More specifically, the graphical user interface (GUI) is generated by the server side code, by taking the data in the second table and assembling HTML layout and object information, such as INPUT tags. However, aspects of the interface are controlled by other database entities like stored procedures that, depending on various information for the user or the particular transaction file that is open, can alter the graphical user interface from a standard that is stored in the layout table.

In accordance with another aspect of the present invention, there is provided a system for the automated processing of a transaction and its attendant documentation, including: a network accessible by a plurality of users involved in the transaction; a database, accessible via said network, allowing controlled access thereto by the plurality of users and storing data related to said client, said database further including at least a first table having embedded rules wherein the rules define a work-flow for the transaction and at least a second table defining the attributes of a display of information from said database; and a web-based user interface, responsive to information stored in said second table, that provides access to said database, such that the appearance of said user interface is dynamically controlled as a function of the second table.

In accordance with yet another aspect of the present invention, there is provided a method for dynamically creating a user interface for managing work-flow during the provision of services in a real property transaction, including the steps of: providing a network accessible by a plurality of users involved in the real property transaction; creating a database, accessible via the network, the database allowing controlled access by the plurality of users and storing data related to the client, the database further including at least a first table having embedded rules wherein the rules define a work-flow for the real property transaction and at least a second table defining the attributes of a display of information associated with said real property transaction; and providing access to the database for the plurality of users via a user interface in the nature of a web browser, wherein said user interface is dynamically controlled as a function of the second table.

One aspect of the invention deals with a basic problem of the display of information in a web-based system—where in most cases the format and type of information is pre-defined and cannot be easily changed without a modification of the system software. Moreover, such modifications would then impact other users of the system. This aspect is further based on the discovery of a technique that alleviates this problem. The present invention employs techniques, using data-driven, dynamic presentation code generation to manage and control the display code sent to a browser interface based not only on an update of dynamic data associated with the process or transaction, but also based upon dynamic data used to control the generation of the user interface.

As a result of the present invention, a multi-user system is possible, even one in which multiple users may be interacting from different organizations, wherein presentation data stored within the system itself controls the manner in which the user is able to view and access the process data. Thus, it is entirely possible, with the present invention, to provide a common work-flow process control system where the same engine/server is used to provide the work-flow system to multiple organizations, with the interface customized to the requirements of each organization, and users therein—yet the only modification necessary to the system to accommodate diverse user-interface customizations is a change of data within tables in a database.

BRIEF DESCRIPTION OF THE DRAWINGS

FIGS. 4A-4C depict tables from a database that may be used to drive the card structure and content in accordance with an aspects of the present invention;

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. A "document" as used herein refers to a medium of communication, including, but not limited to: digital media in the form of bitmap image representations of hardcopy materials, electronically composed pages (e.g., ASCII or portable document language (PDL) formats such as Interpress® and PostScript®), word processing documents, e-mail or similarly stored or transmitted messages, and equivalent manifestations of digital information. Documents may also comprise or contain objects such as images, text, graphics, sound, media clips and other elements therein.

The following description will utilize an exemplary real estate closing embodiment of the present invention for purposes of description and teaching herein. However, the present invention is not limited by such an embodiment.

Figure 1:
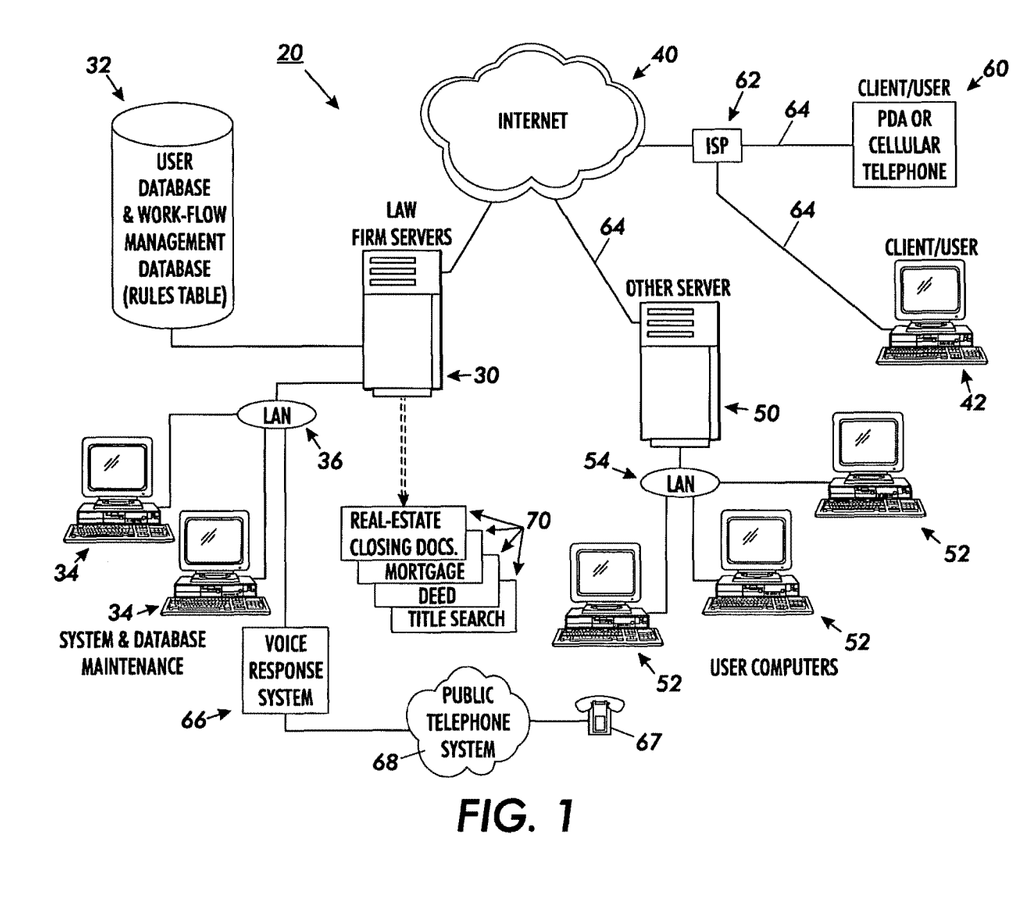
FIG. 1 is a schematic illustration of an embodiment of the present invention.

The real property transaction workflow management system is designed to facilitate and automate a real estate closing, including the various interactions with lenders, sellers, buyers and other users and service providers that need to be involved in the process. In accordance with a preferred embodiment, the present system, as depicted in FIG. 1, may be built on an open architecture client-server architecture such as Microsoft SQL Server and Internet Information Server and File Server 30 (or equivalent servers/database software systems) and Database 32. Database 32, associated with a file server 30, will be the centralized repository for all data that will feed and integrate the closing modules briefly described below, as well as the presentation data that controls the manner in which information is depicted on the browser-based user interface. Integration of such modules in accordance with a defined, or rule-based, work-flow is key to an efficient process, particularly with the elimination of redundant data entry that is costly both in time and in the potential for introduction of errors. Database 32 is also, preferably, the repository for the rules that determine the work flow for the system—in the form of rules tables, stored procedures and algorithms.

Referring further to FIG. 1, there is illustrated a system 20 that includes servers 30, for example servers in or hosted on behalf of a law firm or real estate transaction company. Servers 30 are interconnected with the database 32 as well as a plurality of users 34 (or clients in a client-server configuration) via a network such as a local area network, LAN 36. It will be further appreciated that other network configurations such as wide-area, wireless and distributed network configurations may be employed to accomplish the present invention. Similarly, servers 30 are also interconnected, via the Internet 40, or other network, to a plurality of additional users 42, and clients, mortgage companies, real estate agents, financial and lending institutions, service providers, etc. as represented by server 50 and users 52, which may also be interconnected via a wired or wireless network represented as LAN 54.

As is well known in the telecommunication technologies, connections to Internet-hosted information and systems may also be accomplished via wireless communications devices 60 that are interconnected or linked via an Internet Service Provider (ISP) 62 and wired or wireless communication channels 64. Similarly, the system may be accessed via voice recognition and response systems 66 that are interfaced to a user telephone 67 via a public telephone system (PTS) 68. As will be appreciated from the following description, system 20 may be employed, under the control of a rule-based software application, to manage the flow of work or process information, recording such information and processing in database 32. Moreover, the system is capable of generating, as required, documents (hard copy and/or digital) necessary to document or facilitate the process, thereby providing not only completed documentation, but also an audit trail or trace of the steps through which the transaction has proceeded. For example, real estate closing documents 70 may be generated by system 20, via database 32 and servers 30 in preparation for a scheduled real estate closing. The generated documents may include hard copy mortgage and deed documents necessary for recordation of the transaction. It is also possible for the system depicted in FIG. 1 to be implemented using electronic documents and electronic signatures, wherein the creation, execution and recording/storage of such documents is accomplished with little (hybrid closing) or no hard copy document output (electronic closing).

The eSys Mortgage Centerware™ system will preferably archive, on-line, all records created during the process so as to provide a semi-permanent or permanent, accessible archive that is accessible to users who interact with the system during the process. From the moment a closing matter is initiated, throughout the entire pre-closing, closing, and post-closing process and beyond to mandated records storage, all data, documentation and information will be available to users, such as employees in the closing department, on-line and at their fingertips. In addition to archiving transaction documents and records, in one embodiment of the system, there are provisions for capturing "notes", where users can enter text or similar digital information which will be "attached" to the file. Users may also choose to email the note. The notes are intended to be "conversational", in that other users can review them and respond, and so that a history of the back and forth correspondence is displayed. Such a system will streamline all phases of processing a transaction by eliminating the need to search for information in various forms and locations as well as the expense of sending paper files offsite for storage. This on-line review of the Virtual File Folder™ could be extended to all parties involved in the transaction via the Internet or other network connections.

The proposed system, via software associated with the servers 30, accommodates data interchange via extensible markup language (XML) or equivalent interface, for example, Electronic Data Interface/Exchange (EDI/E) as opportunities arise to electronically obtain as well as supply data and services. The system may also provide the ability to interface eSys Mortgage Centerware™ software with Lender's loan-origination software as well as data collected at the earliest opportunity in a transaction, perhaps by brokers at the point where a property is put up for sale—as such systems come on-line. The potential exists to greatly reduce the cost of transferring or messengering documents and re-entering, with potential for error, information already captured into either the loan origination software or eSys Mortgage Centerware™ system. These improvements alone, are believed to significantly reduce file processing time and allow the closing system to handle a larger volume with existing staff.

As represented by FIG. 2, based on the requirements of each closing program, and loan type for multiple lenders with multiple investors, tables of customizable rules, and algorithms are stored in SQL procedures or Visual Basic procedures. These rules govern data entry, calculations, data selection, document selection, and an event driven tickler system to notify users of status, tasks, etc. In short the presentation layer of the application is currently directed at a robust frame or engine that is database driven to dynamically produce the content and the interface for the user. The most obvious advantage of such a design is that minor changes, as well as complete interface overhauls, can be accomplished in a very short amount of time.

Figure 2A:
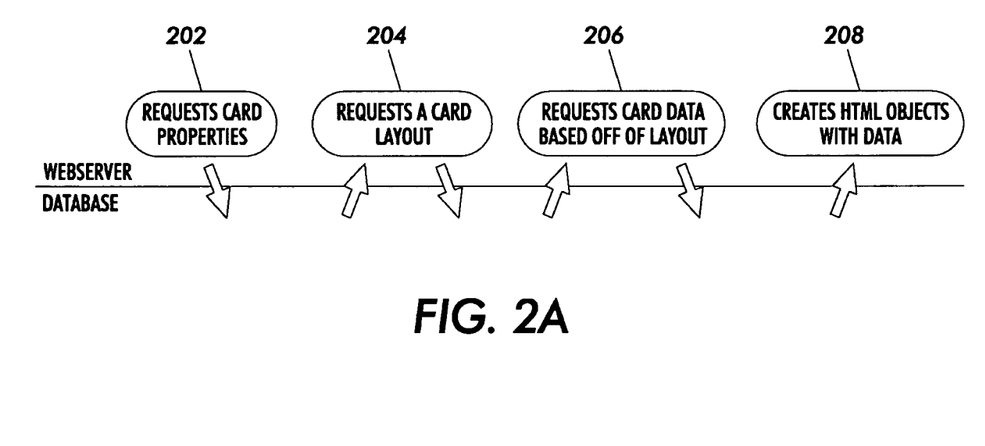
FIG. 2 is a general representation of the process used to create certain aspects of the user interface presentation in accordance with the present invention.
Figure 2B:
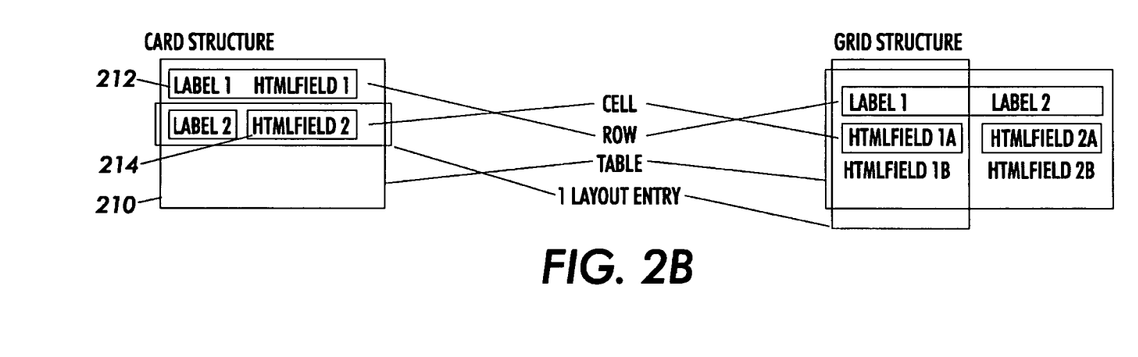
Figure 2C:
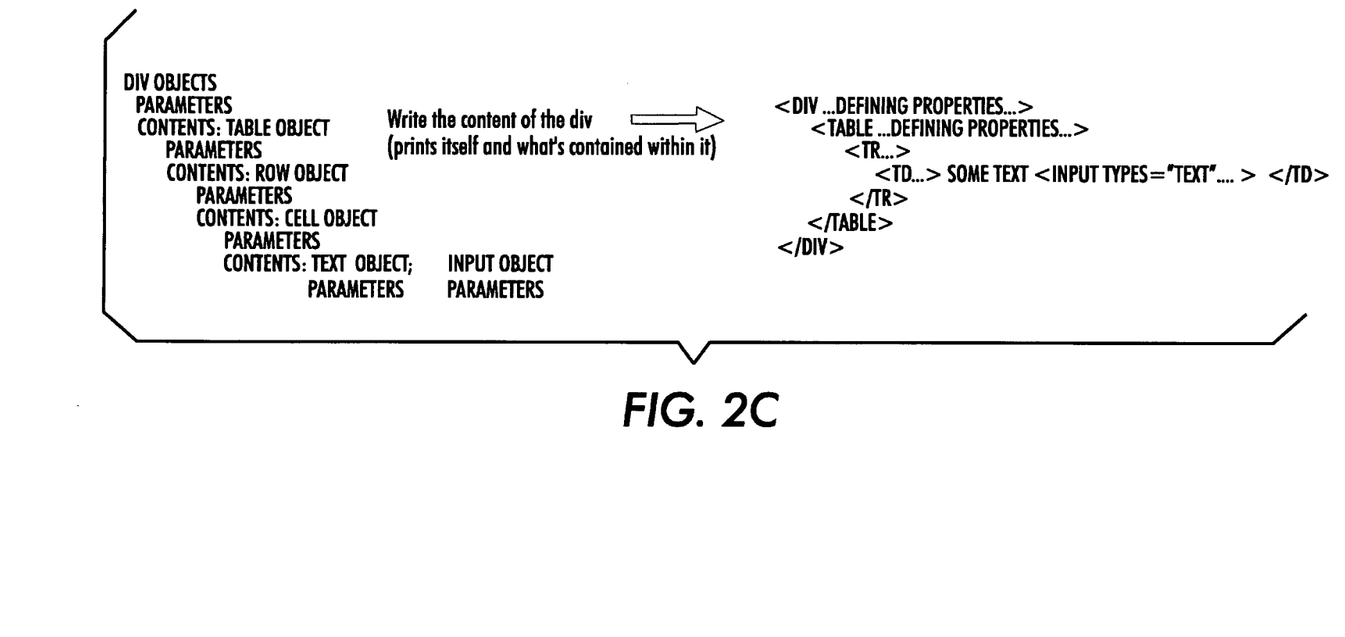

Referring next to FIGS. 2A-2C, FIG. 2A illustrates one process by which a "card" (i.e., interface screen depicting certain information within the eSys Mortgage Centerware™ system) can be created is illustrated. Once a user initiates a request for a card, the web server requests the card properties or attributes 202. The database returns these properties to the web server, which includes the information required to proceed to a layout request, such as the type of the card (Card or Grid) and display properties or attributes for the card. The web server, after receiving the card properties, requests the card layout 204. The card layout is a record-set of information about each field, or series of fields, in a card or grid, and is preferably stored in the database as described herein. Each field of the card (e.g., FIG. 2B) has defined HTML, DHTML, and CSS properties, with unlimited expandability of parameters through the use of arrays, information about the data source of the field (including additional stored procedures and processes required to populate complex fields such as drop downs), and other dynamic properties such as calculation identifiers—all of which are expandable because of the object oriented structure of the dynamic field generation scripts. After the web server returns the card layout from the database, which mostly pertains to display and how to get the data for each of the fields from the database, it must then proceed to getting the data, the Request Card Data step 206. After retrieving the data for the fields in the Card/Grid from the database, it then populates the fields with this data. At this point a recursive 'structure' of objects and properties has been generated, pertaining to the specific card, filtered by any such means as the User, Organization, AppMode, or FileID, or any field or property relating to the specific or related FileID as deemed necessary in the layout table or card properties table. A top level function is then called to propagate through the tree of objects and output browser interpretable HTML code, 208. The end result is a series of HTML objects, that define the card and allow the browser to display the card, dynamically generated by properties in the card properties and card layouts tables, and in some cases fine tuned (in manner of display or otherwise) to the specific properties of the FileID opened. In order to facilitate the saving of data, each field has a unique identifier generated. This identifier can be used, along with the card layouts table, to determine what field and table is the source/destination of the User's input. Furthermore this is not the only use of the dynamic object generation based on tables. The Card Menu is also dynamically generated by the same method as above, but for a different purpose: navigation. This generation is also filtered by even more criteria, including User, GroupID, AppMode, ClientID, and data specific to the status and specific information contained within the FileID.

Figure 3:
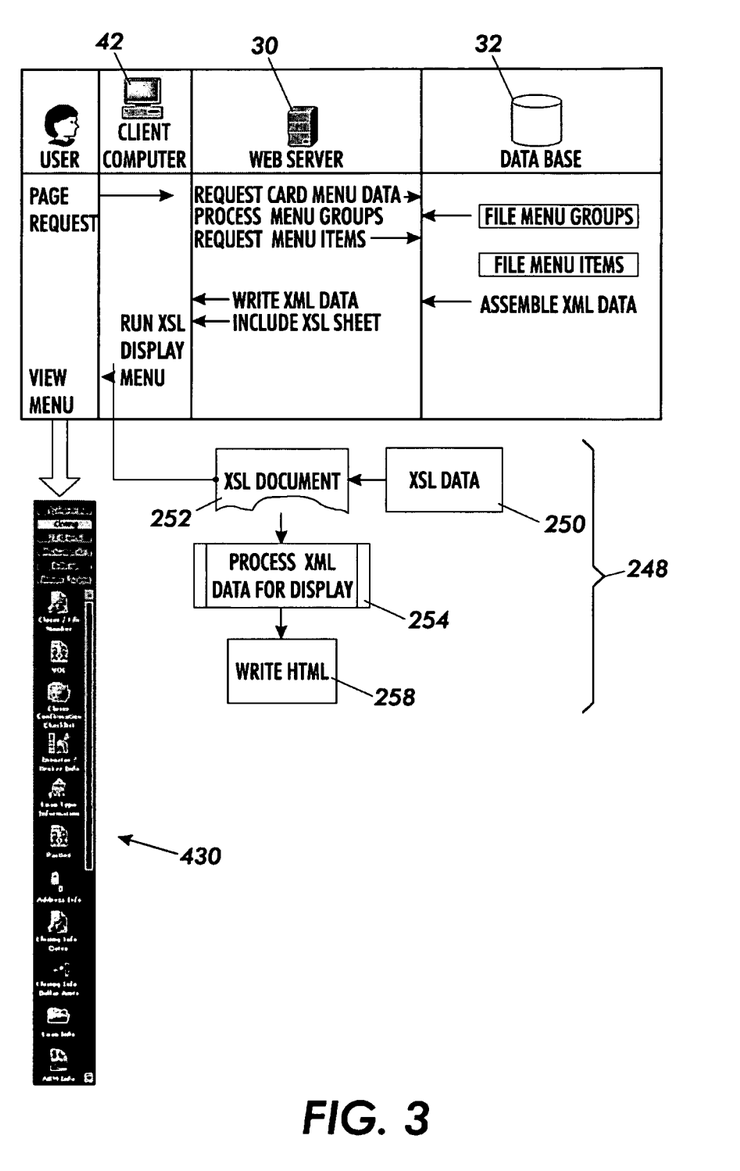
FIG. 3 is a general representation of an alternative process employed to create certain aspects of the user interface presentation in accordance with the present invention.

In another embodiment, the operation set forth generally in FIGS. 2A and 2B may be replaced with an alternative process as depicted in FIG. 3. In order to optimize the generation of specific site features, especially features that repeatedly format a large amount of data for display, a non-linear process may be employed in implementation of the site. This process involves a relatively simple markup structure known as XML to transport data from the database 32 to the client 42 without the overhead of the HTML code necessary to format this data. Also sent to the client is a static, cached, XSL translation sheet that defines the rules necessary to format the data for display on the user computer. Once the XML and XSL are transported to the client, client-side JavaScript code processes the XSL translation sheet and data, and places the output into the appropriate space on the page. The advantages to this method include reducing the bandwidth and time required to transfer both data and display markup to the client, as well as distributing the processing load to client machines.

More specifically, as represented in FIG. 3 the card is generated using an XML result set and XSL translation sheet. In response to a page request initiated by the client or user computer, the server 30 requests card menu data and menu items from database 32. Database 32, in response assembles the information. In order to reduce the generation time of the card menu of FIG. 2B, and because of its relatively simple nature, the data for the menu is returned from the database in XML format and stored in an 'XML Data Island' within the HTML page. When the page is then loaded on the Client, client side JavaScript is used to perform the operations 248, to load (step 252) the XSL translation sheet and process (step 254) the XML data 250 into browser interpretable HTML 258. This XSL translation sheet contains standard markup language defined by the XML/XSL standard, which defines the basic rules necessary to generate the menu, and the expected output. While this method preserves the flexibility of storing the interface data in the database and still utilizes the filtering logic within the database, it reduces the overhead on the servers and network by transmitting a more compressed format of the menu data (data only, compared to data and HTML code as described above) to the client, which is then processed almost instantly by the XSL translation sheet into standard HTML. As will be appreciated a similar methodology may be employed by the present invention in the creation of notes or similar card or other interface elements.

As will be appreciated, the present invention employs changes to the presentation layer design and code employs a dynamic, object oriented approach. Combined with storing html parameters and definitions in the layout tables of the database, the system code no longer require modification to webcode in order to accomplish changes and customizations, instead someone can just quickly go into the tables (or use a web tool).

Figure 4A:
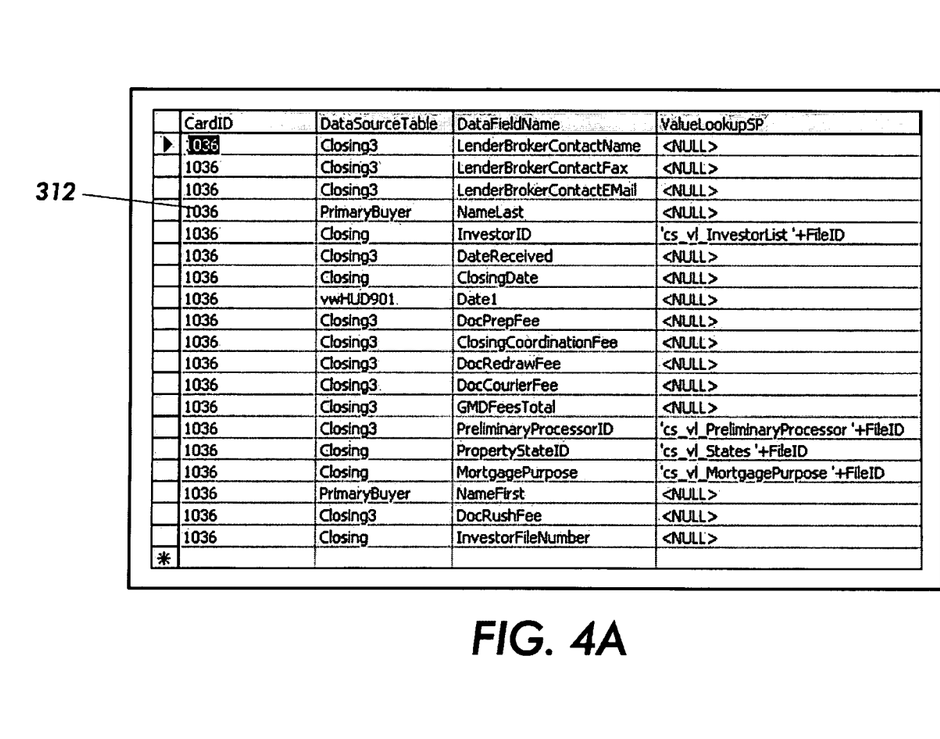
Figure 4C:
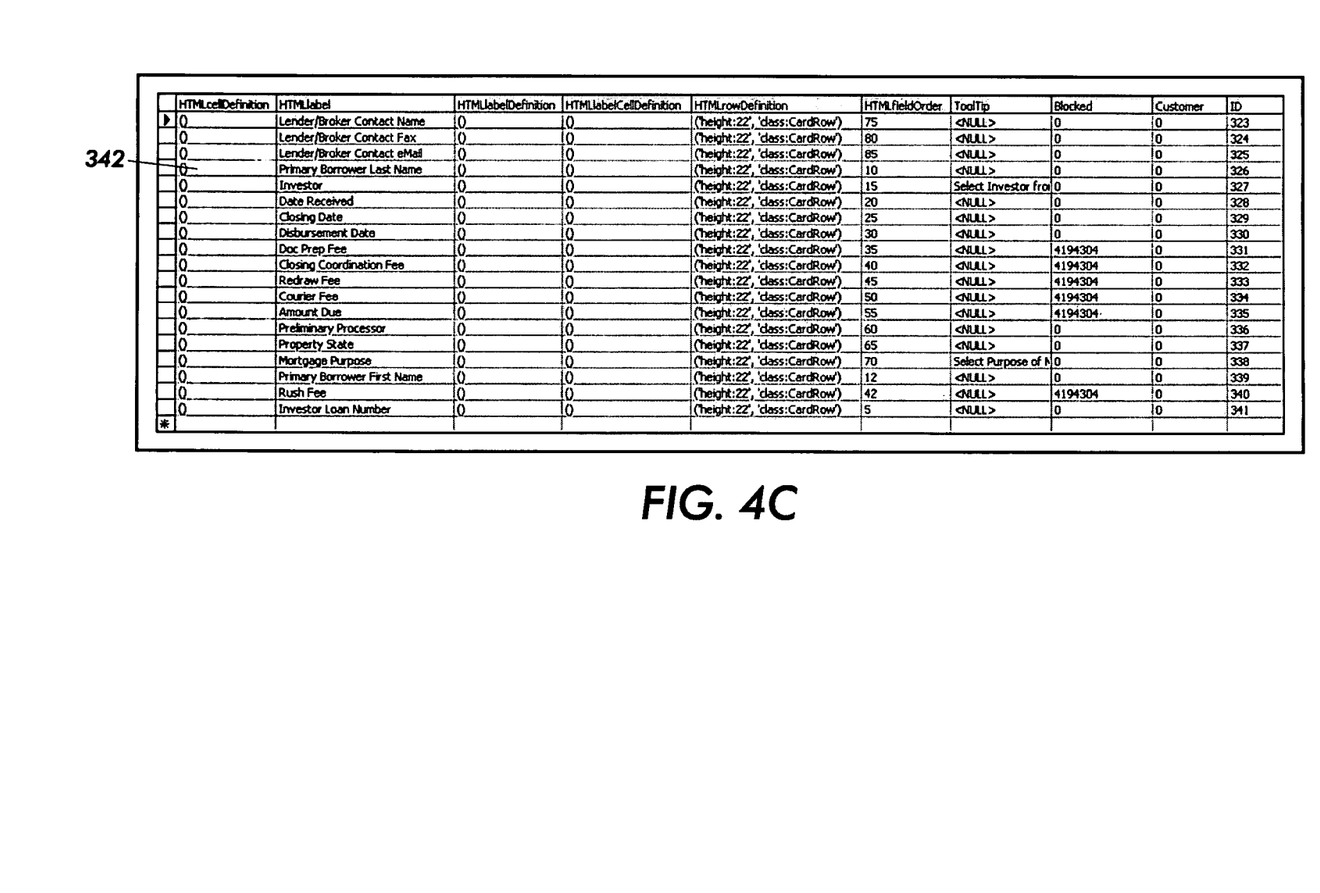

As an example of data driven presentation layers, reference is made to the example in the FIG. 2B, as well as the specific table examples illustrated in FIGS. 4A-4C. In a general sense, the structure of a card in the eSys Mortgage Centerware™ system is shown as card structure 210. The card structure may include labels 212, html fields 214 and other data objects associated with the card. Card Properties specify a definition for and style of the table (among other things), whereas layout Information specifies a definition and a style of the row, cell, and HTML object (among other things). A fixed grid is a card where each field is a column, and is replicated for N number of rows. It is used to display a series of information that applies to N number of aspects of the FileID. For example, displaying information about different types of insurances. All the insurances have the same types of information associated with them, but the information specific to each one is different. A dynamic grid is a fixed grid where a User can insert rows. In the previous example, it would support user additions (i.e., adding another type of insurance, or specifying a desire for another insurance policy). It contains (N+A) number of rows, where N is the default set of rows, generated by the system, and A is the user entered number of rows.

Figure 5:
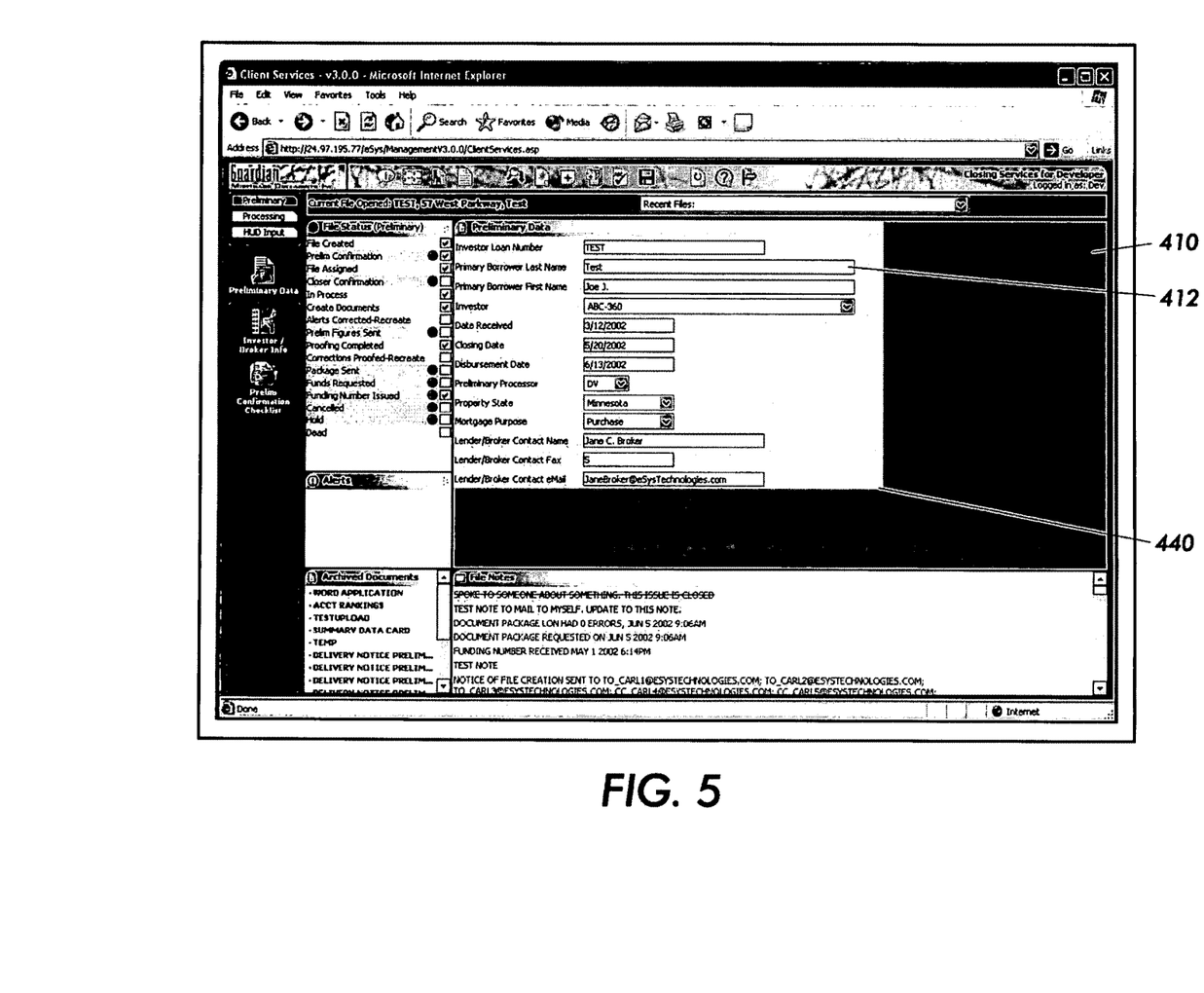
FIG. 5 is an exemplary user interface screen that is generated and presented in accordance with the tables of FIGS. 4A-4C.
Figure 6:
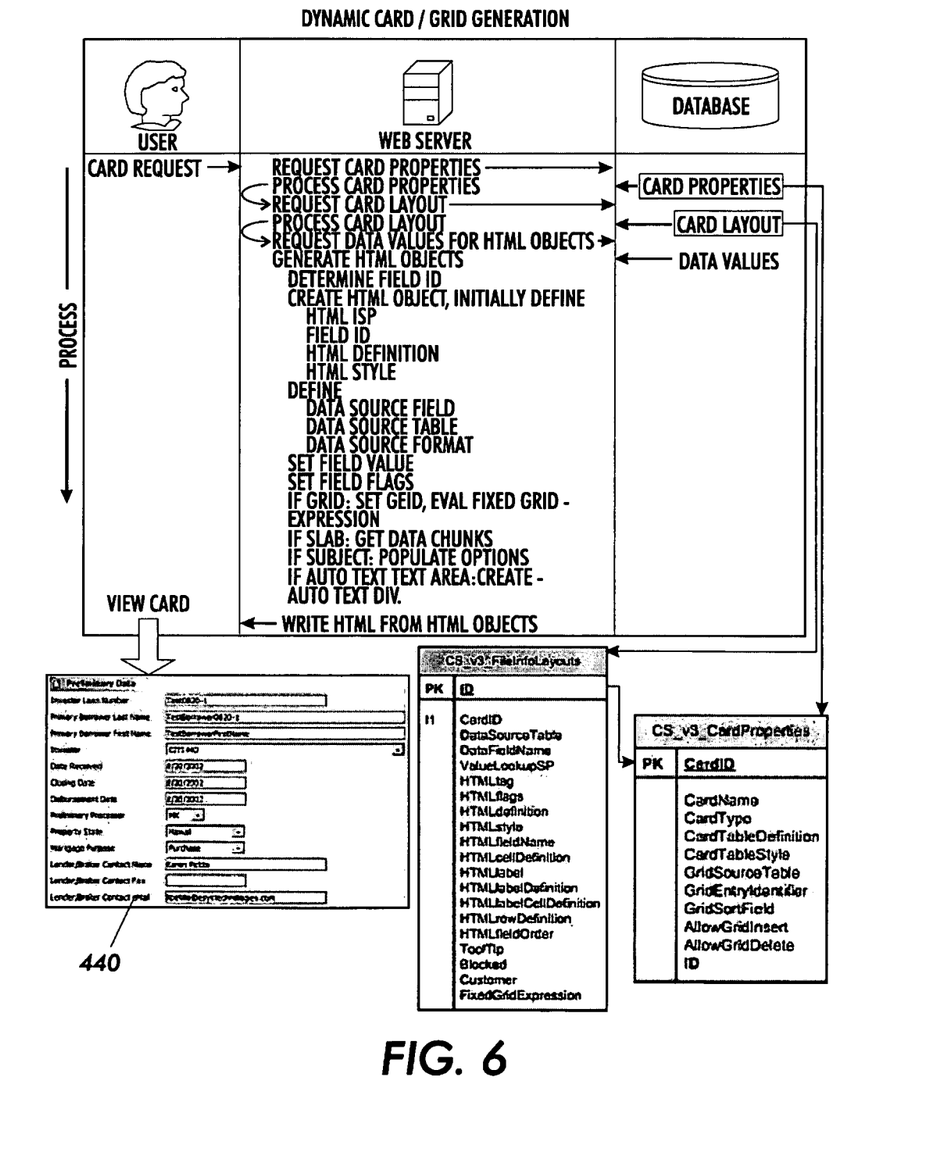
FIG. 6 is an exemplary representation of the process employed to generate the exemplary screen of FIG. 5.

In one embodiment, the aspects of the present invention are implemented using ASP Jscript (Jscript is the Microsoft equivalent of Netscape Javascript, which is used in ASP) function pointers (to create objects) in the following manner. In particular, Jscript doesn't "allow" the creation of objects as say the standard Java programming language or C++ does. However, by using a function pointer, it is possible to assign a variable to a "piece" of code that contains variables and available methods. (hence an "object" but lacking many features, etc. from more object oriented programming languages). What this means for the application is that it is possible to make intelligent data structures with variables and methods that allow an optimized and simple medium between the database layout information and the produced code the user sees. Referring to FIGS. 4A-4C and FIG. 6, there is illustrated how the table of FIG. 5 is to be generated and presented. For example, the Primary Borrower name field 412 in Preliminary Data Card 440 of FIG. 5 is created as a result of the presentation level identifying the preliminary data card 410 as being required by the user. In response to the request, the card having a CardID 1036 as shown in the left column of the table of FIG. 4A, is generated, where the field object 412 is produced in response to the NameLast object and its data retrieved from the PrimaryBuyer Data Source Table (not shown). At the table depicted in FIG. 4B, the specifics for the html characteristics associated with the Primary Borrower Last Name field is set at the fourth row down. Details of the various fields in the layout and properties for the card are reflected in Tables A and B below.

TABLE A

| | Cs_v3_FileInfoLayouts |
|---|---|
| CardID | The unique identifier for the card/grid. It is a many to one relationship between a CardID and its fields. |
| DataSourceTable | The database table that the information for the field is located. |
| DataFieldName | The database field (within the DataSourceTable) that the information for the field is located. |
| ValueLookupSP | (Optional) The Stored Procedure call: for either populating the options within a drop down, or can also be used to populate a field with data that may not be directly accessible from a specific database table and field. |

TABLE A-continued

Cs_v3_FileInfoLayouts

| | |
|---|---|
| HTMLtag | Specifies the HTML tag used for the field. Most commonly input or select. However the system currently supports nearly all HTML tag types. |
| HTMLflags | (Optional) Specific attributes required for some field types. Can include commonly used flags such as 'disabled' or 'readonly'. |
| HTMLdefinition | (Optional) An array of HTML definition parameters. This controls basic HTML level properties, specific to the HTMLtag such as CSS classes, input tag types, maxlength properties, and DHTML event definitions; and also system recognized properties such as dataformats for client side data formatting, and calcIDs for doing calculations based on, or to populate, that field. The format follows the convention:<br>('propertyA:valueA', 'propertyB:valueB', 'propertyC:valueC')<br>Because of the use of literal vs. variables in these arrays, complex definitions, utilizing variables defined in the server side code, can be achieved using:<br>('propertyA:' + dynamicProperty) |
| HTMLstyle | (Optional) An array of CSS properties. This allows for the use of any CSS property on the field, allowing for virtually limitless customizability with regards to the appearance of the object. The format follows the convention:<br>('propertyA:valueA', 'propertyB:valueB', 'propertyC:valueC')<br>Because of the use of literal vs. variables in these arrays, complex definitions, utilizing variables defined in the server side code, can be achieved using:<br>('propertyA:' + dynamicProperty) |
| HTMLfieldName | The name of the field/object. |
| HTMLcellDefinition | (Optional) An array of HTML definition parameters. This controls basic HTML level properties, specific to the cell that surrounds the HTML tag, such as CSS classes, cell alignment and DHTML event definitions. The format follows the convention:<br>('propertyA:valueA', 'propertyB:valueB', 'propertyC:valueC')<br>Because of the use of literal vs. variables in these arrays, complex definitions, utilizing variables defined in the server side code, can be achieved using:<br>('propertyA:' + dynamicProperty) |
| HTMLlabel | The label for the field/object. |
| HTMLlabelDefinition | (Optional) An array of HTML definition parameters. This controls basic HTML level properties, specific to the HTMLtag such as CSS classes and DHTML event definitions. The format follows the convention:<br>('propertyA:valueA', 'propertyB:valueB', 'propertyC:valueC')<br>Because of the use of literal vs. variables in these arrays, complex definitions, utilizing variables defined in the server side code, can be achieved using:<br>('propertyA:' + dynamicProperty) |
| HTMLlabelCellDefinition | (Optional) An array of HTML definition parameters. This controls basic HTML level properties, specific to the cell that surrounds the HTML tag, such as CSS classes, cell alignment and DHTML event definitions. The format follows the convention:<br>('propertyA:valueA', 'propertyB:valueB', 'propertyC:valueC')<br>Because of the use of literal vs. variables in these arrays, complex definitions, utilizing variables defined in the server side code, can be achieved using:<br>('propertyA:' + dynamicProperty) |
| HTMLrowDefinition | (Optional) An array of HTML definition parameters. This controls basic HTML level properties, specific to the HTMLtag such as CSS classes and DHTML event definitions. The format follows the convention:<br>('propertyA:valueA', 'propertyB:valueB', 'propertyC:valueC')<br>Because of the use of literal vs. variables in these arrays, complex definitions, utilizing variables defined in the server side code, can be achieved using:<br>('propertyA:' + dynamicProperty) |
| HTMLfieldOrder | The order in which the fields are generated for the card/grid, ascending. |
| ToolTip | (Optional) The brief description of the field, as seen when hovering over the field. |
| Blocked | (Optional) For filtering fields based on blocked bits. |
| Customer | (Optional) For filtering fields based on customer. |
| FixedGridExpression | (Optional) Allows for creating expressions to manipulate any of the properties of the fields at runtime, using conditional expressions based on current field specifics, or in more advanced uses, allows for comparisons of data across fields and tables, to enhance the user experience with more intelligent cards/grids. |
| ID | (System Generated) A unique ID for each field. Allows for easier field management and for data saving in the system. |

TABLE B

Cs_v3_CardProperties

| | |
|---|---|
| CardID | The unique card identifier for the card/grid. |
| CardName | The name of the card, as shown in the header for the card/grid. |
| CardType | The type of the card: either card or grid. |
| CardTableDefinition | (Optional) An array of HTML definition parameters. This controls basic HTML level properties, specific to the cell that surrounds the HTML tag, such as CSS classes, cell alignment and DHIML event definitions. The format follows the convention:<br>('propertyA:valueA', 'propertyB:valueB', 'propertyC:valueC')<br>Because of the use of literal vs. variables in these arrays, complex definitions, utilizing variables defined in the server side code, can be achieved using:<br>('propertyA:' + dynamicProperty) |

TABLE B-continued

Cs_v3_CardProperties

| | |
|---|---|
| CardTableStyle | (Optional) An array of CSS properties. This allows for the use of any CSS property on the table, allowing for virtually limitless customizability with regards to the appearance of the object. The format follows the convention:<br>('propertyA:valueA', 'propertyB:valueB', 'propertyC:valueC')<br>Because of the use of literal vs. variables in these arrays, complex definitions, utilizing variables defined in the server side code, can be achieved using:<br>('propertyA:' + dynamicProperty) |
| GridSourceTable | (Optional) The source database table or view used by the grid. |
| GridEntryIdentifier | (Optional) The field contained within the GridSourceTable that specifies the unique grid entry identifier (GEID) used for data saving. |
| GridSortField | (Optional) The field contained within the GridSourceTable that specifies the order of the grid entries, ascending. |
| AllowGridInsert | (Optional) Controls whether the grid is fixed or dynamic. A bit, If set to 0, user cannot enter new rows. If set to 1, the user can. |
| AllowGridDelete | (Optional) Opposite functionality to AllowGridInsert. Allows the deletion of grid rows by the user. A bit. If set to 0, the user cannot delete rows. If set to 1, the user can. |
| ID | (System Generated) A unique identifier for the CardID entry. |

From the various rows of the FIG. 4B table, it is apparent that numerous object data classes are used to create the cards, including but not limited to: Form Elements text field such as text area, drop down, combo box, check box, buttons; and HTML Elements such as form, div, table, row, cell, span, image, font tags, etc.

There are many other benefits to this coding design, including:

1. Additions/corrections can be made in cards, altering the GUI, without disrupting other users in the system, and without recompiling the web code.
2. Cards can be created in a manner that allows full customization in practically all aspects. From display to data source.
3. Intelligent generation can be achieved whereby the system determines the necessity of specific fields and includes them as necessary.
4. Full utilization of expanding technologies such as CSS and DHTML can be achieved, since the array method of parameters allows for the addition of new, or even custom, object definitions and style definitions.
5. The interface can be customized on several levels, including clients, groups and users, without the creation of redundant database data. All of which can be easily maintained.
6. Modularity of code. In other words, breaking up process from data structures. Able to change say how the html code is written from the Jscript objects with no effect on any other part of the code for the application.
7. Minimization of code and generalization of code. No need to code specific cases, just the ability (rules) to handle them.
8. Non-linear code design. An object can be created and modified later for whatever reason. (more difficult to do without objects).
9. Adaptability. A sudden need to change the entire way HTML code was generated, could be accomplished easily since all HTML code is written by one function that processes all Objects and writes the code.

In addition, while described in terms of a system supporting legal services associated with real estate closings and titles, the Agent Processing Software, which forms the core or base of the present invention, is also believed to have particular application in other legal and non-legal services. For example, legal services in which the present invention would find particular application include corporate work (e.g., commercial transactions), wills, litigation and commercial real estate. In reality, just about any area where there is a process to follow that results, at least in part, in sets of customized documents and reports, and for which efficiency may be improved by tracking, history, scheduling, event driven auto-notifications and communications among all parties is an opportunity for the present invention. Such alternative applications may include general consumer transactions such as auto purchase and financing, and other consumer transactions requiring notice and rescission periods (e.g., home improvement contracts, etc.). The present invention may also be adapted for use in completing required government reports (including IRS, state and municipal tax filings by businesses and individuals), or for management and control of the acquisition of goods by companies (including Bills of Lading and release of funds for such goods). Thus, the system has application in any services that can benefit from a process that is standardized and automated to an appropriate degree so that anyone qualified can accurately produce any given package.

It is further contemplated that the various aspects of the invention described herein (e.g., dynamic card structures and concepts), may lend themselves to use as utilities that certain users may be provided access to. Such utilities could include creation of new accounts, uploading forms, and entering/modifying a variety of client or "entity" data (for instance broker codes). In short, the present invention may be used to extend the system to allow users the ability to further customize not only an interface, but data and rules as well.

In recapitulation, the present invention is a system where a dynamic interface is generated based upon database tables entirely, so that every aspect of display can be changed from within the database. This separates the rules and logic for displaying information from the ASP code and moves them to the database. Instead of having a scripted page with form elements that request the data from the database, you now have the database returning the elements for display—complete with how to display them, where the data comes from, and any dynamic properties. The primary advantage is evident when trying to maintain a system of several data entry forms. Instead of having several (even hundreds) of ASP pages with hand coded HTML mixed with ASP code, you now have one ASP page, that processes layout information returned from the database, and can display any number of different forms, in different configurations, with the intelligence to adapt the interface to fit the data. This centralization of code makes management easy and eliminates redundancy.

It is, therefore, apparent that there has been provided, in accordance with the present invention, a system and method for generating an interface (e.g., for use in a work flow management system). A most basic aspect of the system and method used to generate an associated web interface is the process of gathering a layout from the database that describes the interface, and then using modular, object oriented ASP code to interpret the layout, and generate it. Such a structure allows for extremely complex interfaces to be built directly from the database, filtered and refined to fit any number of circumstances and conditions, including organizational and/or user customizations or preferences. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A system for the automated processing of a property transaction, including a real estate closing process and its attendant documentation, including:
    a network accessible by a plurality of users involved in the property transaction;
    a database, accessible via said network, said database allowing controlled access by the plurality of users and storing data related to said client, said database further including at least a first table having embedded rules wherein the embedded rules define a work-flow for the property transaction and at least a second table defining at least one attribute of a display of information associated with said property transaction; and
    a web-based user interface providing access to said database, wherein the web-based user interface is dynamically controlled as a function of the at least one attribute defined in the second table,
    wherein the web-based user interface is generated in response to software operating on a server on the network, by taking the data in the second table and generating an XML result set and an XSL translation sheet, and where software operating on a user computer loads the XSL translation sheet and processes the XML result set to produce browser interpretable HTML code to display the interface at the user computer.

2. The system of claim 1, wherein the property transaction includes legal services.

3. The system of claim 2, wherein the legal services provided are associated with a closing of a real property transaction, and includes services rendered both prior to and after the closing of the real property transaction.

4. The system of claim 1, wherein the web-based user interface is generated in response to code operating on a server on the network, by taking the data in the second table and, in response to the data in the second table, assembling HTML layout and object information.

5. The system of claim 1, wherein the web-based user interface includes navigational information and is dynamically generated in response to information that includes identification of the user.

6. A system for the automated processing of a transaction, including:
    a network accessible by a plurality of users involved with the transaction;
    a database, accessible via said network, allowing controlled access thereto by the plurality of users and storing data related to a client, said database further including at least a first table having embedded rules wherein the embedded rules define a work-flow for the transaction and at least a second table defining attributes for the display of information in said database; and
    a web-based user interface, responsive to information stored in said second table, that provides access to said database, such that the appearance of the web-based user interface is dynamically controlled as a function of the attributes defined in the second table,
    wherein the web-based user interface is generated in response to software operating on a server on the network, with an XML result set and an XSL translation sheet employing data in the second table, and where software operating on a user computer loads the XSL translation sheet and processes the XML result set to produce browser interpretable HTML code to display the interface at the user computer.

7. The system of claim 6, wherein the web-based user interface includes navigational information and is dynamically generated in response to information that includes identification of the user.

8. The system of claim 6, wherein the layout of the web-based user interface is a record-set comprising information about each field of the interface.

9. The system of claim 6, wherein the layout of the web-based user interface includes a record-set comprising information about each field of the web-based interface and where the record-set includes information about the data source of a field of the web-based user interface.

10. The system of claim 9, wherein the record-set includes a stored procedure associated with the field.

11. The system of claim 8, wherein the record-set, also stored in the database, includes an array.

12. The system of claim 8, wherein the record-set, also stored in the database, includes an object oriented structure.

13. The system of claim 8, wherein the record-set, also stored in the database, includes data to control the information displayed in response to data identifying a transaction file that a user is seeking access to.

14. The system of claim 6, wherein the network hosts a database that is employed to provide system access and automated processing of transactions to users from a plurality of organizations.

15. A method for dynamically creating a user interface for managing work-flow during the provision of services in a transaction, including:
    providing a network accessible by a plurality of users involved in the transaction;
    creating a database, accessible via the network, the database allowing controlled access by the plurality of users and storing data related to the transaction, the database further including at least a first table having embedded rules wherein the embedded rules define a work-flow for the transaction and at least a second table defining the attributes of a display of information associated with said transaction;
    following the work-flow for the transaction defined by at least the embedded rules in the first table;
    providing access to the database for the plurality of users, via a web-based user interface; and
    dynamically controlling the web-based user interface as a function of data stored in the second table,
    wherein the web-based user interface is generated in response to software operating on a server on the network, by taking the data in the second table and generating an XML result set and an XSL translation sheet, and where software operating on a user computer loads the XSL translation sheet and processes the XML result set to produce browser interpretable HTML code to display the interface at the user computer.

16. The method of claim 15, wherein the step of providing access further comprises:
receiving a request from a user computer for display of information; and
in response to the request, generating a user interface card having the requested information displayed therein, where the layout and the data depicted in the card are, at least partially, retrieved from the second table.

17. The method of claim 16, further comprising controlling the information displayed as a function of the user making the request.

18. The method of claim 16, further controlling the information displayed as a function of the transaction.

* * * * *